Figure 5:
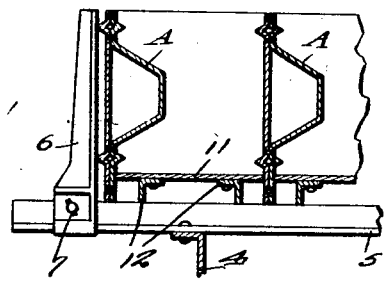

Sept. 2, 1924.
J. A. POTTER
CEMENT BLOCK MOLD
Filed April 18, 1923   4 Sheets-Sheet 1
1,507,515
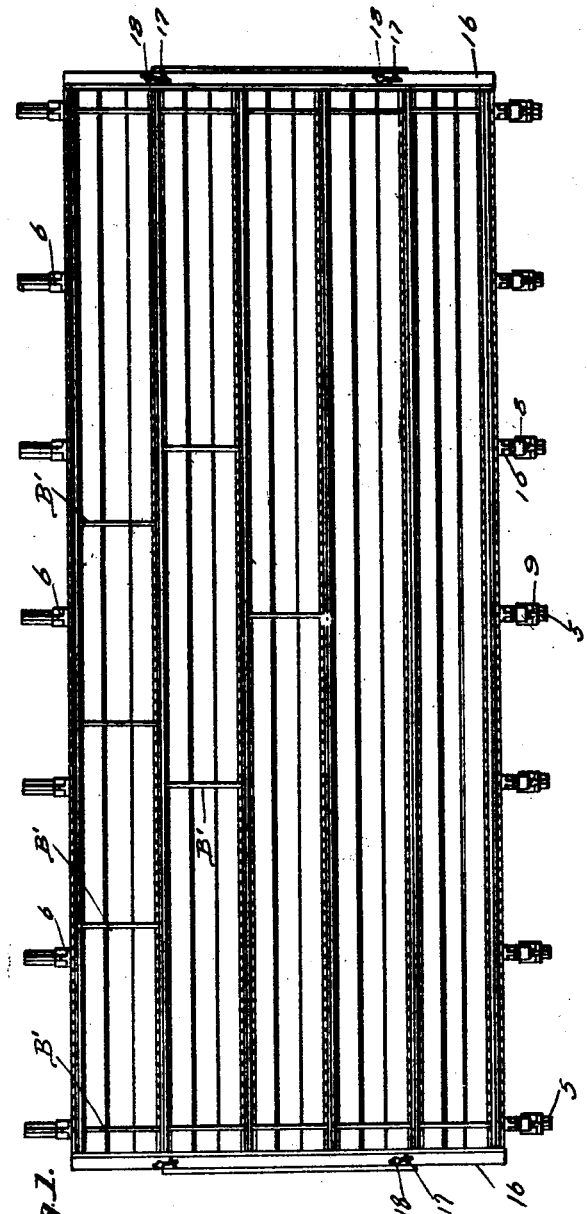
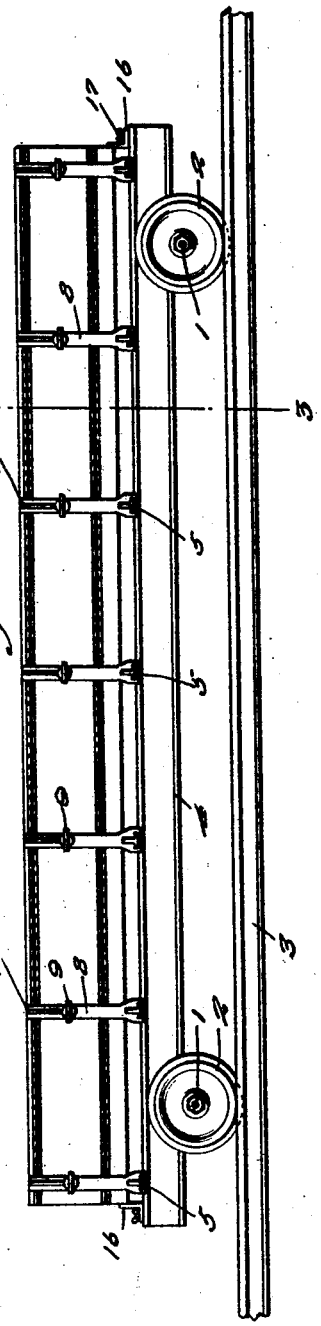

Sept. 2, 1924.  
J. A. POTTER  
CEMENT BLOCK MOLD  
Filed April 18, 1923    4 Sheets-Sheet 2
1,507,515
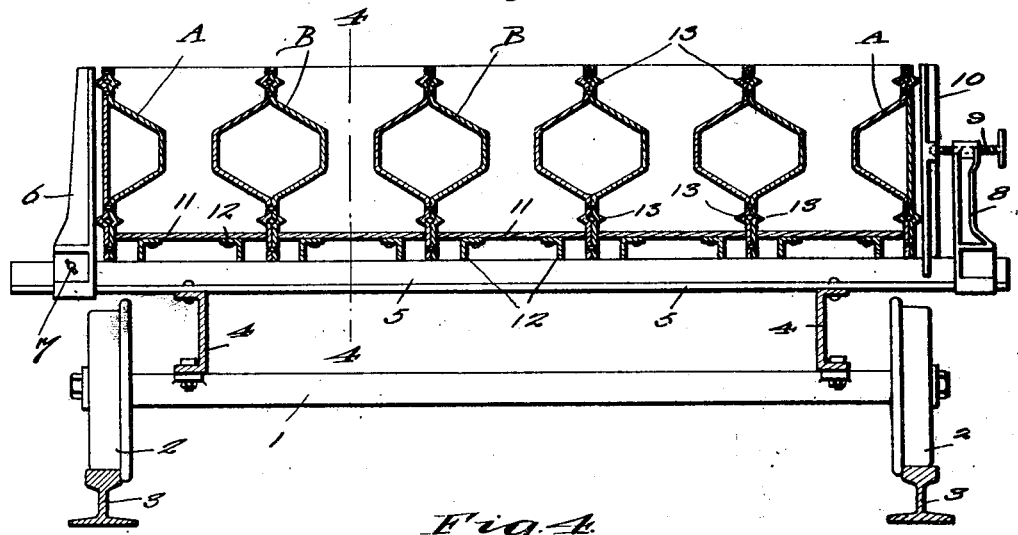
Fig. 3.
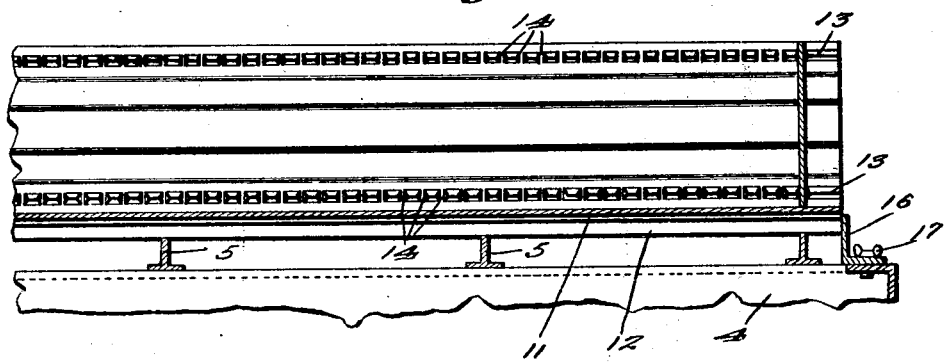
Fig. 4.
  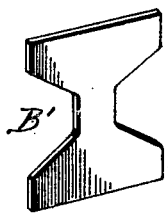 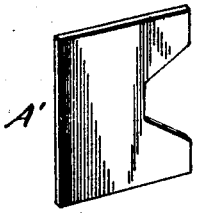
Fig. 14.  Fig. 15.  Fig. 16.  Fig. 17.
J. Aubrey Potter INVENTOR
BY Victor J. Evans ATTORNEY Sept. 2, 1924.
J. A. POTTER
CEMENT BLOCK MOLD
Filed April 18, 1923     4 Sheets-Sheet 3

1,507,515

J. Aubrey Potter   INVENTOR
BY Victor J. Evans
ATTORNEY

WITNESSES
R. A. Thomas

Sept. 2, 1924.                J. A. POTTER                1,507,515
                           CEMENT BLOCK MOLD
                         Filed April 18, 1923     4 Sheets-Sheet 4

J. Aubrey Potter   INVENTOR
BY Victor J. Evans   ATTORNEY

WITNESSES  R. A. Thomas

Patented Sept. 2, 1924.

1,507,515

UNITED STATES PATENT OFFICE.

JOSEPH AUBREY POTTER, OF STAUNTON, VIRGINIA.

CEMENT-BLOCK MOLD.

Application filed April 18, 1923. Serial No. 632,972.

*To all whom it may concern:*

Be it known that I, JOSEPH AUBREY POTTER, a citizen of the United States, residing at Staunton, in the county of Augusta and State of Virginia, have invented new and useful Improvements in Cement-Block Molds, of which the following is a specification.

This invention relates to molds for forming cement building units by the slush, or wet process, the general object of the invention being to provide means for making units of various shapes, and of different lengths and thicknesses, so that it is not necessary to cut the units in constructing a building.

Another object of this invention is to make certain of the units with one solid end, for forming corners and jambs in constructing a wall and others cored on one side, so that by the incorporation of steel and concrete in filling this core or air space a reinforced wall of blocks may be built, and still others made solid throughout for constructing piers, pilasters, etc., for carrying concentrated loads in structures and for lintels over openings, and others for belt courses and sill courses around the building.

Another object of the invention is to provide a series of recesses in the units which will receive the binding mortar when the units are placed in position so that the units will be locked together.

Another object of this invention is the economy in equipment required to manufacture all of the units here mentioned for any purpose which can be accomplished with a single car of combinations and making same face up, face down and scored for stucco finishes, which is the best base possible for stucco.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 6:
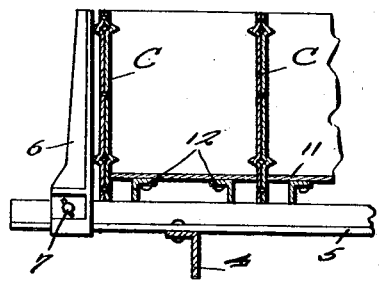
Figure 7:
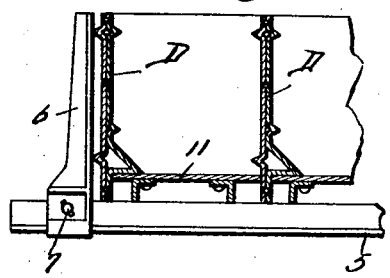
Figure 8:
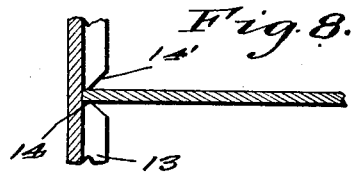
Figure 18:
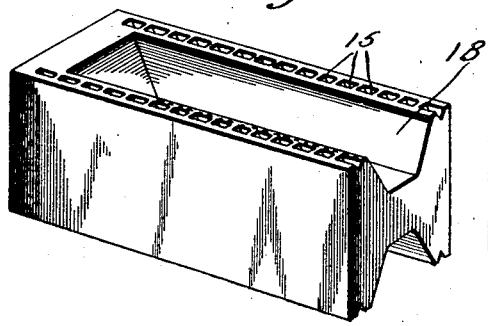
Figure 19:
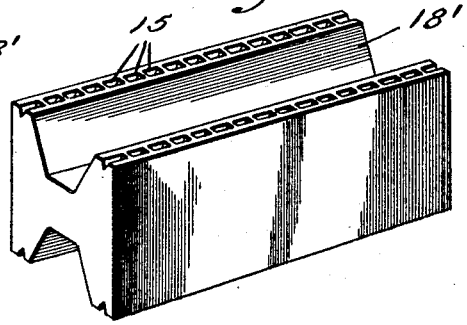
Figure 9:
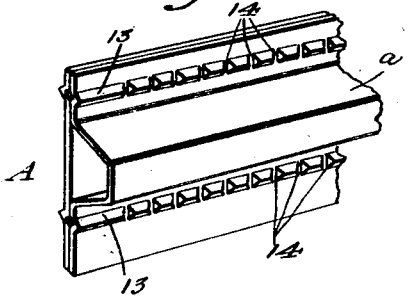
Figure 10:
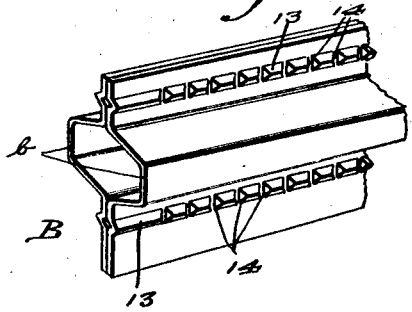
Figure 11:
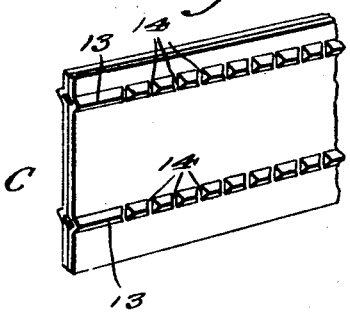
Figure 12:
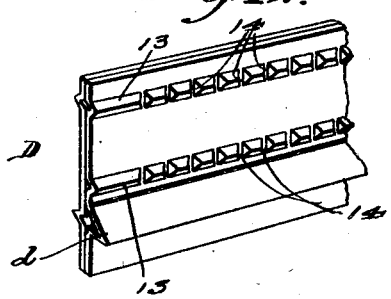
Figure 13:
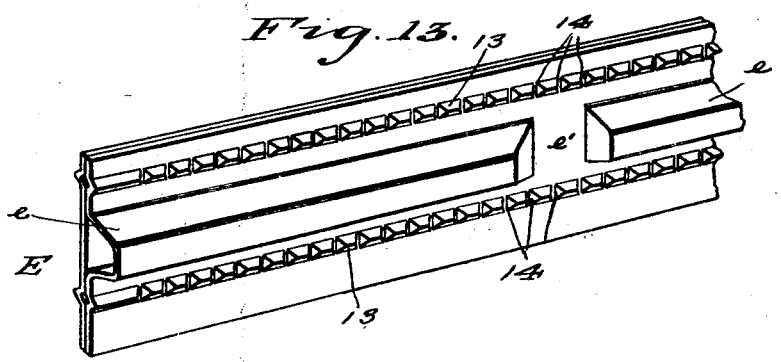

Figure 1 is a plan view of the invention.
Figure 2 is a side elevation.
Figure 3 is a section on line 3—3 of Figure 2 showing the use of one kind of mold plate.
Figure 4 is a section on line 4—4 of Figure 3.
Figure 5 is a fragmentary sectional view showing the use of another kind of mold plate.
Figure 6 is a similar view showing another style.
Figure 7 is a similar view showing still another style.
Figure 8 is a fragmentary sectional view showing how the cut-off plate is held in position.
Figure 9 is a fragmentary perspective view of one form of the plate.
Figure 10 is a similar view of another form.
Figure 11 is a view of still another form.
Figure 12 is a view of another form.
Figure 13 is a view showing a mold plate for forming corner blocks.
Figure 14 is a view of a cut-off plate used with the form plate shown in Figure 11.
Figure 15 is a view of a cut-off plate used with the form plate shown in Figure 12.
Figure 16 is a view of a cut-off plate used with the form shown in Figure 10.
Figure 17 is a view of the cut-off plate used with the form plate shown in Figure 9.
Figure 18 is a perspective view of an H-form of corner block.
Figure 19 is a view of an H form of a block which is used in any other place except the corners of the building.

As shown in the drawings the mold is preferably placed upon the axles 1, the wheels 2 of which engage the rails 3 so that the mold can be easily transported from the filling point to the drying point and vice versa. Channel beams 4 are bolted to the axle and a plurality of T beams 5 are bolted to the upper edges of the channel beams. An upright 6 is adjustably connected to one end of each of the T beams 5 by the clamping bolts 7 while uprights 8 are located on the opposite ends of the beams 5. These uprights 8 have inclined openings therein for receiving the ends of the T beams so that when pressure is placed upon the upper end of the upright the walls of the hole will frictionally engage the T beam and thus hold the upright against movement thereon. Each of the uprights 8 carry a clamping screw 9 which has its head engaging the socket in a clamping member 10 which has its forked lower end engaging the T beam so that the member can be moved on the beam by turning the clamping screw. Thus the space between the uprights 6 and 8 can be adjusted. The bottom of the mold is formed of the flat longitudinally extending plates 11 which have angle irons 12 secured to the lower faces for resting upon the beams 5 so as to support the plates 11 in spaced relation upon said beams 5. The longitudinally extending mold plates are formed of various shapes. The plate A, shown in perspective view in Figure 9, is formed with a tapered projection $a$ at one side thereof. The plate B, shown in perspective in Figure 10, is formed with a tapered projection $b$ at each side thereof. The plate C, shown in perspective in Figure 11, is flat upon both faces, with the exception of the beads hereinafter described, while the plate D, shown in Figure 12, is provided with a small projection $d$ adjacent its lower edge, said projection having a sloping upper face and horizontal lower face. The plate E, shown in Figure 13, is made similar to the plate A with the exception that instead of having the projection extend from one end to the other end of the plate a number of these projections are used, as shown at $e$, with their ends separated so as to leave spaces $e'$ and thus form blocks, each of which has one solid end, as shown in Figure 18. The ends of the projections are sloping so as to make the ends of the groove inclined. All the plates are provided with V-shaped beads 13 which extend parallel with the upper and lower edges of the plates and a pair of which are arranged on each side of each plate, one adjacent the upper edge and one adjacent the lower edge. An appreciable distance from each end of each plate the beads are interrupted at regular intervals so as to leave slots 14 for receiving the cut-off plates C', D', B' and A', shown in perspective in Figures 14, 15, 16 and 17. The slots 14 are formed with short straight walls and then the walls diverge, as shown at 14' in Figure 8, the straight walls holding the plates in position and the sloping walls forming sloping end walls for the recesses 15 formed in the finished block by the beads. It will of course be understood that a certain kind of cut-off plate must be used with a certain kind of mold plate. By making the slots 14 at frequent intervals the cut-off plates can be placed in any desired position in the mold so as to form blocks of any desired length.

When it is desired to form blocks of H-shape, as shown in Figure 19, a mold plate A is first placed in position, as shown in Figure 3, against the upright 6. A bottom plate 11 is then put in place and then the desired number of cut-off plates B' are placed in the slots in the plate A. Of course these cut-off plates are positioned in accordance with the length of the blocks to be formed and attention is called to the fact that the blocks may be made all of the same length or of different lengths, as shown in Figure 1. A second mold plate is then put in place but as the interior mold plates must form the sides of two blocks the plates B shown in Figure 10 must be used. The bottom plates and cut-off plates are positioned as before described and finally a plate A is put in place and then the parts clamped together by the clamp parts 8 9 and 10. Thus a mold, as shown in Figure 3 is formed which will produce blocks shaped as shown in Figure 19. The parts are held against endwise movement by the angle plates 16 which are adjustably held to the beams 4 by the bolts 17 passing through the inclined slots 18 in the angle plates 16. These plates will engage the ends of the bottom plates and the ends of the mold plates and thus hold them against endwise movement. The projections on the mold plates form the grooves 18 in the finished block while the beads 13 form the recesses 15 at the edges of the block so that the blocks in the different rows can be locked together by placing cement or mortar in these recesses. When a corner block as shown in Figure 18 is desired the mold plates shown in Figure 13 at E are used. When it is desired to form blocks with grooves 18 in but one face the mold plates A are used. When rectangular-shaped blocks are to be formed the mold plates C, Figure 11, are used. When blocks with a beveled corner are to be formed the mold plates D, Figure 12, are used. The cross sectional shape of the different blocks will be the same as the cut-off plates shown in Figures 14, 15, 16 and 17.

The cored blocks such as are shown in Figures 18 and 19 will form air spaces for insulating the wall and where the blocks are cored on one side only, steel and concrete may be incorporated in filling this space as the wall is being erected, thus forming a reinforced block wall. With the plates shown in Figures 11 and 12 blocks of different thicknesses may be formed simply by pouring in a sufficient amount of cement to make the block the required thickness. These thin blocks can be made for use in different positions in a building.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A mold of the class described comprising a support, adjustable side supporting members on the support, a plurality of molding plates, base plates adapted to be placed between the side plates, cut-off plates, means for holding the cut-off plates at any desired points along the lengths of the mold plates and means for clamping the parts together.

2. A mold of the class described comprising a support, adjustable side supporting members on the support, a plurality of molding plates, base plates adapted to be placed between the side plates, cut-off plates, means for holding the cut-off plates at any desired points along the lengths of the mold plates, means for clamping the parts together and a wheeled frame for the support.

3. A mold of the class described comprising a frame, adjustable uprights at the sides of the frame, mold plates, base plates arranged to be placed between the mold plates, cut-off plates, means for holding the cut-off plates at any desired point along the length of the mold plates, such means also acting to form recesses in the edges of the formed block and clamping means associated with the uprights.

4. A mold of the class described comprising a frame, adjustable uprights thereon, mold plates, each plate having projections thereon arranged in rows with spaces between the projections of each row, base plates adapted to be placed between the mold plates, cut-off plates resting upon the base plates and engaging the spaces between the projections and clamping means carried by some of the uprights.

5. A mold of the class described comprising a frame, adjustable uprights thereon, mold plates, each plate having projections thereon arranged in rows with spaces between the projections of each row, base plates adapted to be placed between the mold plates, cut-off plates resting upon the base plates and engaging the spaces between the projections, clamping means carried by some of the uprights and means for holding the parts against longitudinal movement.

In testimony whereof I affix my signature.

JOSEPH AUBREY POTTER.